UNITED STATES PATENT OFFICE.

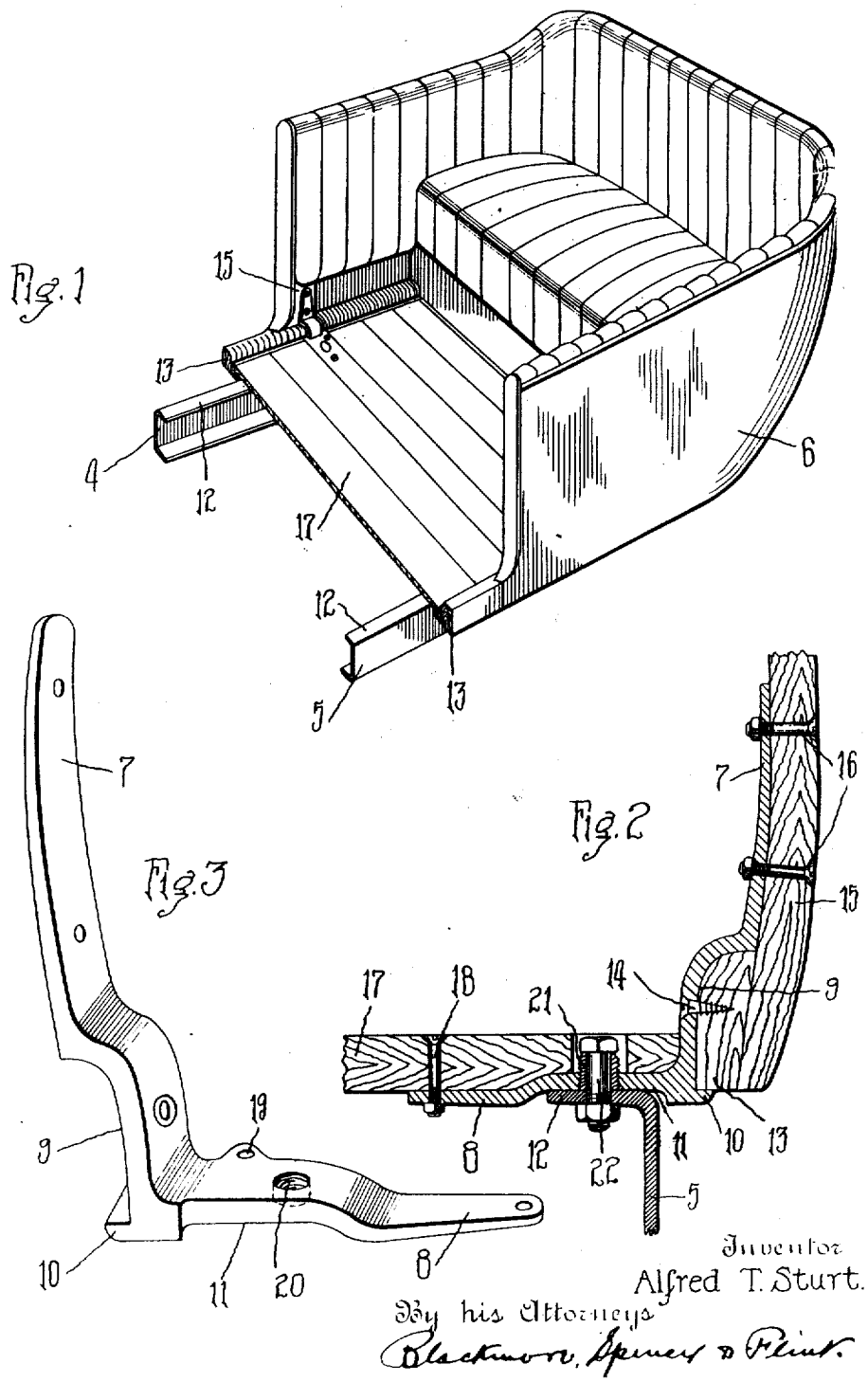

ALFRED T. STURT, OF NEW YORK, N. Y., ASSIGNOR TO GENERAL MOTORS CORPORATION, OF DETROIT, MICHIGAN, A CORPORATION OF DELAWARE.

BODY BRACKET FOR VEHICLE BODIES.

1,406,241.  Specification of Letters Patent.  Patented Feb. 14, 1922.

Application filed February 26, 1920. Serial No. 361,607.

*To all whom it may concern:*

Be it known that I, ALFRED T. STURT, a citizen of the United States, and a resident of New York, county of New York, and State of New York, have invented certain new and useful Improvements in Body Brackets for Vehicle Bodies, of which the following is a full, clear, concise, and exact description, such as will enable others skilled in the art to which the invention relates to make and use the same, reference being made therein to the accompanying drawings, which form a part of this specification.

My invention relates to automobiles and similar vehicles, and more particularly to certain details concerned with the body thereof; and the principal object of my invention is to provide a new and improved body bracket designed for use in securing the body to the frame of the vehicle, and to also form a brace for the vertically extending door posts or other body frame members which are located at the sides of the door opening through which access is gained to the vehicle body or elsewhere therein.

A further object of my invention is to provide an improved body attaching bracket which will be simple in construction, which may be readily manufactured, and which at the same time will be effective for the purpose of both securing the body to the frame of the vehicle and bracing the door posts or equivalent members thereof.

Referring now to the drawing wherein the preferred embodiment of my invention is illustrated:

Fig. 1 is a view showing the rear portion of a body of a motor vehicle in perspective, and illustrating the use therewith of my improved body bracket;

Fig. 2 is a view showing a section upon a vertical plane extending transverse to the vehicle and through my improved body bracket, and through adjacent portions of the vehicle body and the frame of the vehicle; and, Fig. 3 is a view showing my improved body bracket in perspective, and apart from the vehicle body with which it is used.

Referring now to the drawing, the reference numerals 4, 5 designate the two longitudinally extending metallic side bars or frame members commonly present in motor vehicle frames, and 6 designates the body portion or tonneau of the vehicle which is supported from the frame; it being deemed unnecessary to illustrate and describe the remaining portions of the vehicle in order to explain my invention and its use in a vehicle body as such other portions are or may be of any of the common or conventional forms at present in use.

My improved body bracket as shown by itself and apart from the body in Fig. 3, comprises a vertically extending portion or arm 7, and a horizontally extending portion 8 at the lower end of said arm 7; said vertically extending arm being recessed adjacent its lower end as shown at 9 in order to accommodate a longitudinally extending wooden side sill of the vehicle and provided with a flange 10 adjacent its lower end, and beneath the recess 9, which flange serves as a support for the lower edge of a longitudinal side sill of the vehicle. The horizontal portion 8 of the bracket is also recessed upon its under side, as shown at 11, within which recess the upper flange 12 of the commonly employed metallic channel bar side member 5 of the frame lies when the parts are assembled, as best shown in Fig. 2.

The longitudinally extending side sills of the vehicle body extend substantially parallel with the metallic side bars or frame members above referred to and are designated by the reference numerals 13, which sills fit within the recesses 9 of body brackets disposed upon opposite sides of the vehicle body and rest upon the flanges 10 at the lower ends of the brackets, as above explained; and the body brackets are preferably independently secured to the side sills by means of screws 14 or equivalent fastening member.

The reference numeral 15 designates upstanding and substantially vertically extending wooden door posts or similar body members one located upon each side of the vehicle body as will be understood, and the lower ends of which are secured to the upwardly extending arm 7 of the body brackets above the level of the side sills 13 as by means of bolts 16 or equivalent fastening members. The arms 7 of the body brackets extend along the inner surfaces of the door posts 13, and the lower ends of these door posts extend down over the sides of the side sills, as best shown in Fig. 2, and will ordinarily be fastened to the side sills by means of screws, bolts or equivalent fastening members.

Extending from one side of the vehicle body to the other is a transverse wooden bar or sill 17 the ends of which overlie the horizontally extending portions 8 of oppositely disposed body brackets and the extremities of which are commonly recessed as shown in Fig. 2 in order that the body brackets may fit neatly with reference to the end portions of the said transverse sill. The inner ends of these body brackets are offset downwardly, and are secured adjacent their extremities to the ends of this transverse sill 17, as by means of bolts 18; and additional securing members extending through holes 19 provided one in each of the brackets and in the transverse sill may be employed if deemed necessary or desirable.

The reference numeral 20 designates a hole provided in the horizontally extending portion of each body bracket and which hole is interiorly threaded and is so disposed as to register with a similar hole at the end of the transverse sill 17; and the reference numeral 21 designates an exteriorly threaded sleeve extending through the hole 20, and the lower end of which abuts against the upper side of the frame member 5. A bolt 22 extends through the sleeve 21 and a properly located hole in the upper flange 12 of the side frame member, to thereby secure the body in place upon the frame. It will be appreciated that this construction provides for the adjusting of the body vertically relative to the frame by rotating the sleeve 21; after which and when the body is properly adjusted it is secured in place by tightening the bolts 22. This feature of adjustment, however, forms no part of this present application, the same being claimed in my copending application for patent filed upon the 4th day of June, 1919, Serial Number 301,708.

It will be understood that body brackets such as are shown in Figs. 2 and 3 will be used in pairs, and will be located one bracket of each pair upon either side of the vehicle body; each pair of brackets being connected by a transversely extending wooden sill such as the sill 17. As many such pairs of oppositely located metallic brackets as may be necessary to properly brace the door or other upstanding posts of a vehicle body, and to fasten the body to the frame with sufficient security, will be employed in each separate case, although a single pair only of such body brackets and associated parts is illustrated in the drawing and is herein described.

In view of the premises it will be appreciated that the body brackets are built into the vehicle body the sills and door posts of which are of wood during the manufacture thereof. This provides a body complete in itself, and one which in its finished form is provided with means whereby it may be secured to the metallic frame by the bolts 22, so that in attaching the body to a vehicle frame it is only necessary to put the bolts 22 in place and tighten the same after properly adjusting the body by rotating the sleeves 21; thus avoiding the trouble and expense incident to the provision of separate brackets attached to the vehicle body and provided for the sole purpose of securing the body to the frame, as has heretofore commonly been the case in motor vehicle body construction.

The considerable areas of the lower portions 8 of the body brackets obviously form re-enforcing plates which distribute such stresses as may be set up when the body is in use throughout considerable areas at the end portions of the transverse sill 17, thus avoiding localization of the stresses due to possible distortion resulting from roughness of the road along which the vehicle is traveling. Furthermore, the construction of the body brackets provides a direct support for the ends of the longitudinally extending side sills 13 and an effective bracing of the same and of the door posts 15, because of the fact that said arms 7 extend upward between the ends of the sill 17 and the sills 13, and then upward along the inner surfaces of the door posts; and the fact that the brackets are supported from the upper flanges of the frame members provides a construction in which the brackets act to distribute such stresses as occur when the vehicle is in use throughout much greater areas or portions of the body than has heretofore been the case in vehicle body supporting brackets.

Having thus described and explained my invention, I claim and desire to secure by Letters Patent:

1. In a vehicle body, a transversely extending body sill; two body brackets secured one to each end of said sill and having portions extending along the under side thereof, and which brackets are provided each with an upwardly extending portion recessed adjacent its lower end to provide a seat for a longitudinally extending side sill of the vehicle body, and with a flange beneath said recess; two oppositely located longitudinally extending side sills secured in place within said recesses and resting upon said flanges; two upwardly extending door posts secured to the upwardly extending portions of said brackets and the lower ends of which overlie said longitudinally extending sills; and fastening means co-operating with the portions of said brackets which extend along the underside of the body sill as aforesaid, whereby the said body brackets may be secured to the side frame members of a vehicle frame.

2. In a vehicle body, a transversely extending sill; two body brackets located one at each end of said sill and having each a horizontal portion extending along the under side thereof, and which body brackets are provided each with an upwardly extending portion; two oppositely located longitudinally extending body sills secured to said brackets; two oppositely located upwardly extending door posts secured one to each of the upwardly extending portions of said brackets; and openings provided at the ends of said transversely extending sill and extending through the horizontal portions of said brackets, and adapted to receive securing bolts for fastening the body to the frame of the vehicle.

3. A body bracket for motor vehicles, the same being approximately right-angular in form and having a vertically extending side portion recessed at its lower portion and upon its outer side to provide a seat for a longitudinally extending sill, and a flange at the lower end of said recessed portion; and a horizontally extending portion adapted to contact with and be supported by a side frame member of a motor vehicle frame, said horizontally extending portion being recessed upon its under side to receive the upper portion of a supporting frame member and having an opening through which a fastening bolt may extend.

4. A body supporting bracket for motor vehicles, the same being approximately right-angular in form and having a vertically extending portion recessed upon its outer side at its lower end to provide a seat for a longitudinally extending side sill; and a horizontally extending portion adapted to extend along the under side of a cross sill and to rest upon and be supported by a side frame member of the vehicle frame, said horizontally extending portion being provided with an opening adapted to receive a fastening bolt.

5. In a vehicle body, a transversely extending wooden sill, a metal side bar, a bracket supported from the side bar and connecting the sill and side bar and having a recess in its outer face, a wooden side sill extending substantially parallel to the side bar and received in said recess and supported by the bracket, an upstanding body frame member overlapping the side sill, and means for securing said frame member to the bracket above the side sill.

6. In a vehicle body, a cross-sill, a metal side bar, an upstanding wooden body post the lower end of which terminates in line with said cross-sill a wooden side sill extending longitudinally of the body along the lower side edge thereof, and a single bracket interposed between the side bar and the cross-sill and between the side bar and the body post, said bracket serving for holding the body down to the side bar and for bracing said post, and for connecting the post to the cross-bar.

In testimony whereof I affix my signature.

ALFRED T. STURT.